United States Patent
Holler et al.

(10) Patent No.: US 10,394,212 B2
(45) Date of Patent: Aug. 27, 2019

(54) APPARATUS AND METHOD FOR A SECURITY-CRITICAL APPLICATION

(71) Applicant: INTER CONTROL Hermann Kohler Elektrik GmbH & Co. KG, Nuremberg (DE)

(72) Inventors: Alexander Holler, Altdorf bei Nurnberg (DE); Hans-Dieter Kaiser, Dormitz (DE); Werner Pfister, Neunkirchen am Sand (DE); Jorn Rieve, Sulfeld (DE); Hans-Jurgen Emmerling, Thalmassing (DE)

(73) Assignee: INTER CONTROL Hermann Kohler Elektrik GmbH & Co. KG, Nuremberg (DE)

( * ) Notice: Subject to any disclaimer, the term of this patent is extended or adjusted under 35 U.S.C. 154(b) by 756 days.

(21) Appl. No.: 14/410,528

(22) PCT Filed: Jun. 26, 2013

(86) PCT No.: PCT/EP2013/063334
§ 371 (c)(1),
(2) Date: Dec. 22, 2014

(87) PCT Pub. No.: WO2014/001370
PCT Pub. Date: Jan. 3, 2014

(65) Prior Publication Data
US 2015/0338835 A1    Nov. 26, 2015

(30) Foreign Application Priority Data

Jun. 26, 2012    (DE) .................. 10 2012 012 521

(51) Int. Cl.
*H04L 29/06*    (2006.01)
*G06F 21/62*    (2013.01)
(Continued)

(52) U.S. Cl.
CPC ......... *G05B 19/048* (2013.01); *G05B 19/058* (2013.01); *G06F 9/544* (2013.01);
(Continued)

(58) Field of Classification Search
CPC ........ G06F 9/4881; G06F 9/52; G06F 9/4843; G06F 9/5016; G06F 9/485; G06F 9/5011;
(Continued)

(56) References Cited

U.S. PATENT DOCUMENTS 6,401,154 B1    6/2002  Chiu et al.
7,865,888 B1 *  1/2011  Qureshi ............... G06F 11/079
                                            717/168
(Continued)

FOREIGN PATENT DOCUMENTS

CN    101331468 A    12/2008
CN    201837860 U    5/2011
(Continued)

OTHER PUBLICATIONS

Irwin et al., Enforcing security properties in task-based systems, 10 pages (Year: 2008).*
(Continued)

*Primary Examiner* — Thuy Dao
(74) *Attorney, Agent, or Firm* — Merchant & Gould P.C.

(57) ABSTRACT

An apparatus and a method for the parallel and independent operation of a normal program and a secure program on the basis of a runtime system structure have all components that are relevant to the control integrated on a hardware component with a specific hardware architecture and be isolated from one another by a runtime system structure for two dual runtime systems for making changes to non-security-relevant components without restriction. The isolation can be provided by prioritizing one of the runtime systems. Such a runtime system structure or hardware architecture eliminates (Continued)

the need for follow-up certification of user-programmable controllers and the certification of the security-critical component is valid even when changes to the non-security-relevant components are made.

14 Claims, 5 Drawing Sheets

(51) Int. Cl.
    *G06F 17/30*     (2006.01)
    *G06F 21/00*     (2013.01)
    *G05B 19/418*     (2006.01)
    *H04L 29/08*     (2006.01)
    *G05B 19/048*     (2006.01)
    *G05B 19/05*     (2006.01)
    *G06F 9/54*     (2006.01)
    *G06F 21/74*     (2013.01)

(52) U.S. Cl.
    CPC .... *G06F 21/74* (2013.01); *G05B 2219/14012* (2013.01); *G05B 2219/24008* (2013.01)

(58) Field of Classification Search
    CPC .... G06F 9/542; G06F 9/45533; G06F 9/5077; G06F 9/54; G06F 21/74; G06F 21/53; G06F 21/6218; G06F 21/57; G06F 11/079; G06F 11/3688; G06F 11/3664; G06F 9/544; H04L 63/08; H04L 63/105; H04L 63/29; H04L 63/20; H04L 63/102; H04L 63/101; G05B 19/048; G05B 19/058; G05B 13/028; G05B 19/4183; G05B 19/4184; G05B 19/41845; G05B 19/4185

See application file for complete search history.

(56) References Cited

U.S. PATENT DOCUMENTS

| | | | | |
|---|---|---|---|---|
| 7,900,201 | B1* | 3/2011 | Qureshi | G06F 11/079 717/174 |
| 8,074,115 | B2* | 12/2011 | Stolfo | G06F 11/3652 714/38.1 |
| 8,135,994 | B2* | 3/2012 | Keromytis | G06F 11/08 714/38.11 |
| 8,212,667 | B2* | 7/2012 | Petite | G01D 4/004 340/539.1 |
| 8,522,204 | B2 | 8/2013 | Moosmann et al. | |
| 8,601,580 | B2* | 12/2013 | Hansen | G06F 21/6227 726/22 |
| 8,910,238 | B2* | 12/2014 | Lukacs | G06F 21/53 713/164 |
| 8,955,038 | B2* | 2/2015 | Nicodemus | G06F 11/3495 726/1 |
| 9,055,080 | B2* | 6/2015 | Sandhu | G06F 8/61 |
| 9,098,712 | B2* | 8/2015 | Carter | G06F 21/606 |
| 9,276,942 | B2* | 3/2016 | Srinivasan | G06Q 10/06315 |
| 9,898,393 | B2* | 2/2018 | Moorthi | G06F 11/368 |
| 2002/0133531 | A1* | 9/2002 | Fukushima | G06F 9/52 718/103 |
| 2008/0060071 | A1* | 3/2008 | Hennan | H04L 63/1416 726/22 |
| 2009/0124374 | A1* | 5/2009 | Patel | G07F 17/32 463/29 |
| 2009/0216962 | A1* | 8/2009 | Mutlu | G06F 9/4881 711/151 |
| 2011/0209219 | A1* | 8/2011 | Zeitlin | G06F 21/554 726/23 |

FOREIGN PATENT DOCUMENTS

| | | |
|---|---|---|
| DE | 102 12 151 B4 | 1/2004 |
| DE | 10 2005 007 477 A1 | 8/2006 |
| DE | 10 2005 009 795 A1 | 9/2006 |
| DE | 10 2006 001 805 A1 | 7/2007 |
| DE | 10 2006 037 153 A1 | 2/2008 |
| DE | 10 2008 019 040 A1 | 10/2008 |
| DE | 10 2009 011 679 A1 | 8/2010 |
| DE | 10 2009 019 087 A1 | 11/2010 |
| DE | 10 2009 019 089 A1 | 11/2010 |
| DE | 10 2009 047 025 B3 | 5/2011 |
| DE | 10 2010 038 484 A1 | 2/2012 |
| JP | 2010-271759 A | 12/2010 |
| WO | WO 01/75602 A2 | 10/2001 |
| WO | WO 2009/095812 A1 | 8/2009 |
| WO | 2011/044603 A1 | 4/2011 |

OTHER PUBLICATIONS

Vemuri et al., Measures to improve security in a microkernel operating system, 9 pages (Year: 2011).*
Sharif et al., Secure in-VM monitoring using hardware virtualization, 11 pages (Year: 2009).*
Majumdar et al., Systematic testing for control applications, 10 pages (Year: 2010).*
Kwon et al., Intelligent process control system with RFID cuboid, 8 pages (Year: 2009).*
Munson et al., Software process control for secure program execution, 4 pages (Year: 2010).*
International Search Report for corresponding International Patent Application No. PCT/EP2013/063334 dated Jan. 2, 2014.

* cited by examiner

APPARATUS AND METHOD FOR A SECURITY-CRITICAL APPLICATION

This application is a National Stage Application of PCT/EP2013/063334, filed 26 Jun. 2013, which claims priority to application 10 2012 012 521.6 filed 26 Jun. 2012 in Germany and which applications are incorporated herein by reference. To the extent appropriate, a claim of priority is made to the above disclosed applications.

BACKGROUND OF THE INVENTION

The invention relates to a device and a method for a parallel and independent operation of a normal and a secure program for safety-critical applications, particularly in a machine environment.

In the field of freely programmable electronic controls it is common that the controls are adjusted by a configuration of multifunctional inputs and outputs, e.g. for the use in mobile work machines and particularly in respect to customer-specific tasks, which shall be fulfilled by such machines. For this purpose, particular adjustment programs (AWP) are prepared by the producers of work machines based on a programming system, which comprises e.g. the program preparation, a program test, a program translation and/or the uploading of the program into the control. Here, in many cases a run-time system (LZS) is implemented, with it being possible in its environment for the AWP, generated by the programming system and uploaded into the control, to start and operate. The LZS controls the communication between a computer and a control system.

In order to fulfill safety requirements the AWPs must be certified before they can be classified functionally safe and may be used in the work machines for respective applications. In the event a technical program adjustment is necessary at an AWP, e.g. because the tasks to be performed shall be changed in their sequence or duration or speed, upon a technical program change, usually another certification is required, even in case of minimal changes. This leads to work processes or functionalities being not always improved, even when it is known how such an improvement can be achieved. The more secure an AWP has to be, the more difficult it is for an operator or manufacturer of a machine to implement any changes at all, without here a new certification being required. This circumstance is obstructive, primarily when a certain control generally is suitable for a plurality of different applications and their functionality is not fully utilized.

Accordingly, there is a need for software applications in such freely programmable controls, which can be operated parallel and independent from each other without mutually influencing each other, even when they control processes which must comply with different safety requirements. In particular, here the exchange of input and/or output information must be possible to a single-channel hardware, which is certified with regards to a certain safety standard.

The publication DE 10 2006 037 153 A1 shows a method for the secure, technical signal control and monitoring of a vehicle, in which an application software is implemented for processing sensor data on a first relatively more secure computer, and the first computer is released by a second, less secure computer, on which such sensor data can be processed, which are not used for secure purposes, and the two computers communicate via an interface and software for the software diagnostics.

The publication DE 10 2009 011 679 A1 shows a method and a device for the preparation of an application program for a safety control, with a separation occurring into at least two program parts with different requirements with regards to safety. Based on a repeatedly allocated momentary value, conditions for allocating the momentary value, and an allocation in the form of conversion instructions, here an interaction occurs between less secure variables from a first program part and more secure variables from a second program part in order to yield a conversion of a non-safety relevant program variable into a safety-relevant program variable, with here a sensor, embodied in an error-safe fashion, no longer being required for providing the momentary value. In this method a secure program code can be separated from a less secure program code, in order to allow a user program to run on a microprocessor based on the more secure functions.

The patent publication DE 10 2009 019 087 A1 shows a security control and a method for controlling an automatic facility, with it here being possible for test values to be determined for program variables, particularly based on momentary values characterizing program variables. Here, a redundant control with two independent processors may be provided for respectively one type of program variables, with a comparison of the results occurring, particularly a momentary value comparison, in order to allow performing an initialization of the safety control with regards to a momentary safety situation.

The patent publication DE 10 2009 019 089 A1 shows a method and a device for the production of an application program for safety controls, with a source code with control and diagnostics instructions being prepared and based on the source code a machine code being generated, in order to determine a check sum for a part of the machine code independent from the diagnostics instructions. Here, the safety control is based on a certain type of determining this check sum depending on certain safety codes.

From the above-mentioned publications it is discernible that the independence of the process of the safety-critical program component is ensured for the safety controls when the applications requiring a higher safety standard operate separated from the applications with less secure applications.

Furthermore, in DE 10 2005 007 477 A1 a machine control device is shown based on a PC operated with an operating system, in which in addition to a standard control, a safety control is provided as well, and a separation can occur of the safety-relevant functions from the functions not relevant for safety by a modular distribution within the machine control device into at least one safety module, particularly by a separation on the hardware level, with safety-relevant functions exclusively being processed in the safety modules, and a separate certification of the safety-relevant assemblies being possible, here. It is provided that an interface towards the outside is formed via the part which is not secure. The safety module may be embodied as a PC-plug in module, which communicates via a PCI-interface with the standard control.

DE 102 12 151 B4 shows a method for safety-critical applications, in which data in two differently processing environments is deciphered respectively using a safety time interval, so that, thanks to the given redundancy, the deciphered data can be issued at various times or also in the form of various data, and the failure risk is thus reduced.

In 10 2005 009 795 A1 a microprocessor system is shown for a machine control in applications that can be provided with safety certifications, in which, in addition to a primary processor, at least one safety processor is used with a separate program/data storage, with both processors using the same communication bus. Program data can be stored in program memories of the safety processors, without the primary processor being able to access this data, particularly by a secure transmission path being used comprising a general bus and mailbox with a state machine for loading the data into the safety processor.

DE 10 2006 001 805 A1 shows a safety device for a multi-channel control of a technical safety device in case of a malfunction, by which a technical safety device can be operated in the secured state, with two control devices being connected to each other via an input stage, which performs a signal modulation.

In DE 10 2009 047 025 B3 a real-time run-time system and a functional module are shown for a purpose, in which at certain status transitions, particularly between the test operation and the real-time operation, the functional module can be activated and/or deactivated.

DE 10 2010 038 484 A1 shows a method for a device to control a facility, in which an error monitoring can occur.

The above-stated prior art therefore relates generally to memory-programmable controls, which show a separate architecture in reference to individual computers, program parts, or controls, or allow a temporary decoupling of functional modules, and which are suitable for applications, which must meet certain safety requirements. In such architectures a normal run-time system (LZS) may be integrated on hardware, which is capable of starting an application program (AWP) and have it operate, with the LZS reading data from the physical inputs and bus systems and providing this data to the AWP for processing, and with the LZS starting a cycle of the AWP and connecting to each other the input data and potentially saved data, and with at the end of the AWP-cycle output data being provided, which is issued by the LZS at the physical outputs and bus systems, which represents the general functionality of a memory-programmable control (SPS). In such architectures, optionally a secure LZS can be integrated on hardware, which operates in the same fashion as a normal LZS, and which additionally fulfills various safety standards, e.g. 61508 or 13849. Commonly, here an operating system is provided, which must be implemented as well, and in which a change of individual safety-relevant functions would lead to an expensive subsequent certification. It is already pointed out in the above-mentioned DE 10 2005 007 477 A1 that a machine control with individual safety-certifiable safety-modules offers advantages for the certification, however here a certain PC-infrastructure is required, and the safety modules must be integrated via an operating system and a PCI-bus.

SUMMARY OF THE INVENTION

The objective is to provide an architecture, classified functionally secure, or a method, which can be classified as functionally secure, particularly in the context with a control for an application program (AWP) and to provide an operator of a hardware environment with the option to perform changes in an AWP in a simple or cost-effective fashion, even when different progressions, processes, partial programs and/or program steps each must be controlled with respectively specific safety requirements, particularly when they deviate from each other. It is particularly the objective to control an application program on a specific safety level such that any compromising of the safety of the overall system can be excluded. One objective may also comprise allowing a process control with a specific hardware environment such that several processes with different safety standards are prevented from mutually influencing each other even when changes must be performed at one of these processes. Last but not least, an objective is also considered to provide a simple hardware or control architecture, in which relatively safe processes can be controlled in a simple or flexible fashion, in addition to normally safe processes, without here the safety level being compromised.

According to the invention it is suggested to provide a run-time system structure for the device according to the preamble, in which the run-time system (LZS) is a component of a run-time system structure, which is embodied at least in duplicate and is based on a first and a second LZS, with the first LZS being embodied as a secure LZS and the second LZS as a normal one. The two LZSs each meet respectively specific safety requirements. The normal LZS may be activated by a secure LZS, particularly in a first (lowermost) priority level. The run-time system structure is therefore structured with different safety levels and/or comprises different safety levels. This way, a simple architecture can be provided, in which a separate operating system is not necessary so that any changes can be implemented without any expensive subsequent certification. In particular, a secure LZS can be used, which is preliminarily certified and, once the secure LZS has been certified and/or accepted, it remains certified. A supplier of controls is here only required to obtain a certification for the addition of a secure LZS on separate hardware, specific for the manufacturer, particularly by the secure LZS and the normal LZS being certified combined with the hardware to form a unit.

Preferably, the storage types mentioned in the preamble are embodied as conventional standard commercial storage components. However, in the device according to the invention it is also possible, optionally to embody the storage types mentioned in the preamble as an individual, connected storage, such as an individual physical storage unit, and to provide various storage sections in this individual physical storage unit, which then can be separately accessed. In particular, a first storage module and a second storage module and storage means may be provided together with a single physical storage unit.

Here, the first LZS may be operated parallel in reference to the second LZS, without any redundancies being given but the two LZSs each respectively performing individual steps and/or processes, and a control of different processes can occur parallel. A particular operating system designed for the run-time system structure embodied at least in duplicate is not required, particularly because the architecture according to the invention can be formed, particularly via the microcontroller, as a simple system capable of multitasking. The run-time system structure according to the invention therefore provides an autonomous architecture, which does not mandatorily require a separate operating system. In particular, the structure of a microcontroller can be used, by utilizing the timer with the microcontroller as the operating system replacement and different task levels being provided without any operating system. Here, a microcontroller can be named as an example, which shows four timers, and these timers may be allocated to certain priority levels according to the invention. The processing of tasks can occur distributed over these priority levels. The number of priority levels is not necessarily coupled to the number of timers. Optionally the number of priority levels, particularly the priority levels for secure functionalities and for system monitoring, may deviate from the number of timers, which can preferably be controlled via software mechanisms, so that an arbitrary microcontroller can be used independent from the number of desired priority levels. However, it may also be advantageous to use such microcontrollers, which show a particularly suitable structure and/or number of timers for the desired number of priority levels, so that special software mechanisms can be waived, here.

Nonetheless it is also possible, additionally to provide a secure operating system, particularly a secure real-time operating system, which particularly fulfills the required safety specifications, and which allows processing the application programs via the secure operating system, which can be particularly advantageous when more than two LZSs shall allow for the application programs to run together. Then, the LZSs in their entirety are embodied as the run-time system structure and combined they form an interface between the AWPs and the safe operating system. Optionally the interface may also be formed by the secure LZS alone.

However, according to the invention it is not necessary to provide an operating system: the architecture according to the invention allows the option that both LZSs, thus the secure LZS and the normal one, can allow the AWPs to process simultaneously, particularly based on their allocation to different priority levels. The run-time system structure may be designed such that every LZS accepts the tasks, for which it is optimally designed. The secure LZS can also control the processing of tasks, which actually shall be controlled by the normal LZS but not vice versa. The tasks may be distributed between the two LZSs, particularly by the secure LZS. In particular, an allocation of input data, the type of connecting input and/or output data, and the allocation of output data can occur by an application programmer, who may represent the generator of the AWP and/or AWPs. The normal LZS may be called by the secure LZS, particularly in a first (lowermost) priority level. This way an efficient operating manner can also be ensured. Tasks of the secure functionality are processed in the secure AWP, and tasks of the normal functionality are processed in the normal AWP. The tasks may be allocated to different priority levels, e.g., tasks in the context with one of the so-called process safety time, which depending on a respective machine range e.g. from 100 to 200 ms, to a second priority level, and the tasks in the context with a digital control process, which are all processed e.g., in intervals from 5 to 10 ms to a third and fourth (respectively higher) priority level.

Due to the architecture showing different priority levels it is beneficial for the system integrator, thus a programmer, to attempt providing sufficient space for the first (lowermost) priority level, so that in this level any tasks or partial tasks can actually be processed. In particular, levels with a higher priority, thus e.g., a second, third, and fourth level, may not claim excessive computing time, so that tasks can also be processed in the first priority level.

Here, an objective shall be understood as a task, which is performed as a part of an AWP at a certain priority level. In another sense, an objective is preferably understood as every processing step, in which a part of an AWP is processed at a certain priority level, either a regulation or an execution of an actuation or another computing step requiring computing time. In the context with the secure functionality the objective may include e.g., to prevent any unintentional motion of a machine or to monitor the limits of load moments of a crane, and in the context with the normal functionality the objective may represent e.g., to activate and/or deactivate a cabin heater.

Here, preferably a run-time system structure shall be understood as a structure and/or environment for a LZS, in which it is possible to integrate individual LZSs in a hardware environment such that a certain AWP can run on a computer. If only a single LZS is provided, as is the case in the controls of prior art, the run-time system structure may preferably represent the LZS itself and/or the control-specific processing environment. A definition of the term is not required, here.

According to the invention, a dual run-time system structure shall be understood as a structure and/or environment for several LZSs, in which it is possible to provide several LZSs parallel as well as independent from each other. In a dual run-time system structure, therefore, a type of run-time system classification and/or hierarchy is given. In particular, in a dual run-time system structure two LZSs may be provided, which are embodied separately for their respectively own process control on different safety levels. A hierarchy can be provided at least to this regards such that the secure LZS can activate the normal LZS or temporarily can set it into an inactive state. The term of a dual run-time structure can therefore be understood in the sense of an architecture, which allows the coexistence of at least two LZSs. The two LZSs may meet different safety requirements so that here a run-time system structure with dual safety steps can be assumed. The run-time system structure may relate to more than two ZLSs and thus it is no longer embodied with a dual, but a triple or quadruple quality, or with even more numerous differentiations between the LZSs. In a triple LZS, here three different LZSs may be provided parallel, in a quadruple one, four LZSs.

The LZS are decoupled from each other such that the different priorities of the tasks of the more secure LZS always show higher priority for processing than the tasks of the normal LZS. According to one example, for the secure functionality three priority levels may be provided (though not mandatory), particularly a second, third, and fourth level of priority, and for the normal functionality only one (not mandatory, either) background loop with the lowest priority. By program technology the secure and the normal LZS are therefore decoupled at least by way of prioritization. The only dependency may here comprise that the secure LZS calls and/or starts the normal LZS. If no operating system is provided, the secure LZS can perform the control alone. In the event that a safe operating system is provided, particularly a secure real-time operating system capable of multi-tasking, this may accept the function of the secure LZS.

Here, a run-time system (LZS) shall be understood preferably as a processing environment, by which a user program (AWP) can be executed without it being required here that it communicates with an operating system. The LZS therefore ensures that an AWP remains operational.

Preferably the first LZS is provided in a different physical storage than the second LZS. Furthermore, it is preferred to provide each LZS in a flash drive, particularly storage with a memory safe at zero voltage. In particular the first secure LZS is provided in an on-chip flash drive and the second normal LZS in an on-board flash drive.

Here, safety-critical applications in a machine environment shall be understood as all safety-critical applications, in which individual machines, devices, or facilities at last partially operate based on procedures or processes which must meet certain safety standards. Here, particularly mobile work machines or general construction machines are used as machinery.

Here, in general an LZS and/or a control component shall be understood as a secure LZS, in which a review occurs by the LZS itself. A separate shut-off or an exchange to a safety mode can occur when less secure partial processes are detected automatically. Secure LZS may check themselves and/or "review" their own actions. Contrary thereto, a LZS characterized as normal lacks such capacity.

The term control component can here be mentioned together with the term run-time system (LZS) because an LZS can preferably be understood as a software component and in the present case two different and/or independent LZSs may be discussed. By the separation of secure and normal processes, here two control components may be discussed as a part of a control system. The term control system shall be understood as a superordinate concept, though because the control system according to the invention is designed such that it comprises two LZSs.

In other words, the invention is also based on the acknowledgment that two LZSs may use the same processor and/or the same hardware without here any mutual interference or endangering of safety requirements being possible. This architectural concept offers advantages also in that several processors or other redundant hardware components are no longer necessary. Any previously required, preferably complete physical separation for safety reasons can be overcome, among other things, by different priority stages in connection with system monitoring as well as the use of storage components communicating with each other in combination with a monitoring and/or protective component, as explained in greater detail in the following.

Here, a detailed definition of the safety standard is not required. The safety level may be arbitrary. An LZS characterized as secure in one certain application may therefore be considered a mere normal LZS in another application, particularly because, in spite of the capability to monitor itself, certain criteria cannot be detected during the check, which however can be recognized by the so-called secure LZS. To this regard, the terms "normal" and "secure" represent relative terms, which emphasize that in two LZSs one of them, with regards to the ability to self-monitor, shows an improved functionality in reference to the other LZS. The architecture according to the invention is therefore not limited to a certain safety standard, either.

Preferably the secure LZS in connection with system monitoring, which may particularly comprise a monitoring component, and the system monitoring are preferably arranged on a priority level, which is higher than a priority level in which the secure LZS can be arranged. This way, in a simple fashion, any repercussion is safely prevented.

Here, the invention can particularly be allocated in the context with the following components and/or parts, which allow a process control and in which a potential embodiment can be considered at least partially representing components of the architecture according to the invention:
  a CPU with an on-chip RAM component, according to a first integrated storage component, and an on-chip flash drive, according to a second integrated storage component;
  an on-board RAM-component arranged separated from the CPU according to a first integrated storage component, and an on-board flash drive arranged separated from the CPU, according to a storage area;
  the hardware component according to the invention, on which the run-time system structure is provided.

The RAM-components may also be understood merely as a potential variant for the storage. Here, other storage units may also be used, and the arrangement may be varied as well. The use of flash drives may be deducted from a particular implementation. According to one variant all storage components may also be combined e.g., in a single storage component, which shows several storage areas, which are connected to a certain LZS or a certain AWP. This means, the particular allocation to hardware is variable. Accordingly, for example a distribution may be performed into: program storage LZS (secure), program storage AWP (secure), operating storage LZS (secure), work storage AWP (secure), program storage LZS (normal), program storage AWP (normal), operating storage LZS (normal), operating storage AWP (normal), common storage (shared memory) LZS, common storage (shared memory) APW.

In one architecture according to the invention the secure LZS is generally responsible for reading input data from physical inputs and bus systems and for the issuance of output data to physical outputs and bus systems. This objective is performed by the secure LZS for reasons of functional security. The secure LZS is here in most cases only used as a subset of the overall existing input and output information because a remaining amount of the overall available input information, not used by the secure LZS, can be provided by the secure LZS for the less secure, i.e. normal LZS. A residual quantity of the overall available output information not used by the secure LZS can be used by the less secure, i.e. normal LZS. For this purpose, the respective output information can be transferred to the secure LZS.

Here, the secure LZS is called the first LZS, because it assumes a priority position over the normal LZS and the second LZS, figuratively speaking, it is rather integrated in the secure LZS than operating autonomously and parallel thereto. Simultaneously, it is possible to add further components in addition to the existing hardware component, such as circuit boards to expand the number of physical input/output terminals and/or to add bus systems. This way, the number of input/output information to be exchanged can be increased, which may also require accordingly adjusting the capacity of the storage area provided for this purpose.

The first storage component may e.g., be embodied as an operating storage component, particularly an on-chip RAM component, and the second storage component may be e.g. embodied as a flash drive, particularly an on-chip flash drive.

The freedom from repercussion of the normal AWP can here be ensured by the use of a protective component and/or a monitoring component and here the freedom from repercussion with regards to storage is given such that the secure LZS is controlled via system monitoring so that the normal LZS and/or the normal AWP, even in case of a false system interpretation by the system integrator, is not capable of preventing the secure LZS and/or the secure AWP from processing the tasks. Inversely, a secure LZS and a secure AWP, in case of wrong system design, are indeed capable of preventing the normal LZS and/or the normal AWP from processing normally. The protective component can e.g. be embodied as a so-called memory protection unit (MPU). The monitoring component may be embodied e.g., as a storage management unit, i.e. as a so-called memory management unit (MMU). The MMU may here supply the more comprehensive functionality to provide, among other things, safety and/or security, but also to provide a virtual address area.

It shall be mentioned that the hardware component provided may be equipped with integrated components, which may contribute to the control of the method according to the invention. This includes, e.g., the above-mentioned MPU and MMU, which may be embodied as integrated components in normal 32-bit CPUs, and not formed as additionally required components. MPU (memory protection unit) and/or MMU (memory management unit) operate however such that here for arbitrarily selected periods of time the access to predetermined storage sections can be blocked. Thus, the operating memory of the secure LZS can be blocked for the time of the processing of the less secure, i.e. normal LZS. This way it can be prevented that a normal process compromises a secure process. In particular, the MMU can prevent that the normal LZS has repercussions upon the secure LZS. Depending at which point of the process the secure LZS is given, the MMU can here be activated or deactivated.

According to one exemplary embodiment, the first run-time system is provided for processing a first application program and the second run-time system for processing a second application program. The two application programs can here be executed in a single storage or also in different physical storage units, with one of them preferably representing the second storage component, which may be embodied particularly as an integrated flash drive, preferably an on-chip flash drive. Both application programs may here be interacting with the hardware component, particularly via run-time systems and/or the run-time system structure.

This way, within one device functionally secure and less secure normal application programs (AWPs) can be executed simultaneously, and any interference of the less secure (normal) AWP upon the secure AWP can be excluded, particularly by a system monitoring, the secure LZS can be granted priority in relation to the normal LZS. This way a separation of the AWPs can occur, and one AWP can be reprogrammed without the other AWP being affected thereby.

The secure LZS is here, figuratively speaking, the bowl or the shell, in which a safe application program is embedded. In other words, in the eyes of the customer only a normal application program (A WP) changes, in which he can implement changes without any major expense, and the customer alone is responsible for the certification of a secure A WP. Here, particularly in special cases, it may also be beneficial for the provider of controls to adjust the normal LZS to the changes of the A WP performed by the customer.

The invention is therefore based on the acknowledgement that software architecture can be realized, in which two different control systems can be combined on one hardware component so that two AWPs can be generated for a freely programmable control, which are independent from each other with regards to technical security and which process independently from each other. The control systems may respectively comprise at least one LZS. A connection of two generally independent control systems on one hardware component leads to an architecture, in which changes can be implemented without here a renewed certification being required. The two control systems may share existing inputs/outputs and bus systems, particularly by the input and the output of data at buses being controlled only and exclusively by a secure LZS and/or a secure AWP.

Input data may be routed and/or forwarded e.g., from the secure AWP to the normal AWP via the common storage (shared memory) AWP. Output data may also be routed from the normal AWP to the secure one via the common storage (shared memory) AWP and here perhaps filtered by the secure AWP so that the data of the secure AWP cannot be overwritten by the normal AWP. In other words, input data of physical inputs, such as from bus systems of the secure LZS, can be uploaded and transferred to the secure AWP. In the secure AWP all input data can be rendered available for the normal AWP. The output data generated in the normal AWP can be transferred to the secure AWP and therefrom, in a filtered fashion, be forwarded to the secure LZS and therefrom to the physical outputs and bus systems. Thus, the secure AWP and the secure LZS are in full control over the input/output data and the normal AWP can only manipulate this data to the extent permitted by the secure AWP, and the absence of repercussions can be ensured.

However, input and/or output data can also be directly routed e.g., via the secure LZS between the hardware and the normal AWP, thus without the detour via the secure AWP.

Such a design can ensure that all AWPs, thus secure as well as normal AWPs, can process and be executed independent from each other. A system control, monitoring the two control components and/or the dual run-time system structure, can here ensure the functionality of the overall system by allocating suitable processing times to different priority levels. In particular, endless tasks can be avoided, which would prevent any efficient operation of the architecture overall. The system monitoring itself is provided on the highest priority level or levels. The system monitoring may be formed by one or more monitoring components (so-called watch dogs) and optionally also by interrupting components (so-called interrupts), although interrupts, in the narrow sense, are not allocated to system monitoring. The allocation of the above-mentioned priorities can therefore ensure that the normal AWP during processing cannot have any repercussions upon the secure AWP.

The system monitoring can here represent a part of an interim product, certified according to a certain safety standard, e.g., SIL2. The system monitoring may be equivalent to a documented specification and realization of a secure LZS, which can be purchased from a supplier of controls for implementing a separate control.

The system monitoring can check if all jobs and/or tasks of the secure AWP have been processed according to the predetermined times. If this was not the case, the control can be brought into a secure state. Here, it is not necessary that the system monitoring monitors the normal LZS or the normal AWP.

According to one exemplary embodiment, which can be combined with one of the previously mentioned exemplary embodiments, the first application program is a safe application program and the second application program is a normal application program. This way it can be ensured that the higher safety standard of one LZS corresponds to a higher safety standard of an AWP.

Here, any data exchange can be performed either by the secure LZS, cooperating with the secure AWP, or via the secure AWP itself. The data exchange can occur via the common storage (shared memory), particularly between the following pairs of LZS and AWP.

|  | Secure LZS | Secure AWP | Normal LZS | Normal AWP |
|---|---|---|---|---|
| Secure LZS |  |  | X | X |
| Secure AWP |  |  | X | X |
| Normal LZS | X | X |  |  |
| Normal AWP | X | X |  |  |

In the following, some examples are explained for a data exchange:

for diagnostics and debugging the data exchange can occur from the secure LZS to the normal LZS and vice versa;

when showing input data for the normal AWP the data exchange can occur from the secure AWP to the normal AWP;

when showing output data from the normal AWP the data exchange can occur from the normal AWP to the secure AWP;

when showing the interior temperature of the housing, which is detected for example by the secure LZS and transmitted to the normal AWP, the data exchange can occur from the secure LZS to the normal AWP.

Here, the secure and the less secure, i.e. the normal program components are organized in two different application programs, particularly in order to allow ensuring an independent processing via the dual run-time system structure.

The secure AWP can run in the context with a secure LZS, and the normal AWP can be based on a normal LZS. The ability to communicate, realized in the respective LZS, for uploading and for diagnostics allows the separate handling of a secure AWP and a normal AWP, similar with regards to functionality in reference to different controls with respectively their own AWP.

In other words, an isolation or separation occurs of the AWPs, which are classified as functionally secure, from those AWPs, which fail to meet such safety requirements, thus must be called normal AWPs. In particular, such AWPs comprising different safety standards may process in different physical memories on a single hardware component. This way, the control device can remain freely programmable by a user or operator, without any subsequent certification being necessary, particularly in case of SIL2 software applications. Here, SIL2 refers to the second of four classes of requirements according to the so-called "safety integrity level", with SIL2 according to the standard IEC 61508 providing a safety standard, which meets the risk of major damages to equipment or personal injuries. However, the standard itself is only stated as an example to promote a better understanding, and the present invention may just as well relate to other safety standards, particularly higher safety standards, such as SIL3. Another safety standard to be mentioned is e.g., the standard DIN EN ISO 13849-1, which discusses performance stages a to e, with the performance stage (performance level PL) d being similar to the safety level SIL2. The safety level itself is initially without any influence upon the architecture according to the invention, with a two-channel design perhaps being preferred starting at a certain safety level. However, even in case of a two-channel design, the architecture may be selected such that in the eye of the user only a single-channel design is discernible, particularly by still only one program part and one data storage part being given, and only the CPU being provided redundantly. Ultimately, the specifications of a particular safety standard are decisive, to be met by the control system, which criteria must be fulfilled "securely" in order to award certification.

This way, on a single freely programmable control and within a single device, the process of AWP can occur with differently high safety standards.

According to one exemplary embodiment, which can be combined with one of the abovementioned exemplary embodiments, the first safe application program is embodied for the purpose of running in the second storage component, using the first storage component as an operating memory. This way, the normal application program can be isolated such that it remains free from any repercussions upon the relatively more safe application program and vice versa. Any changes to the less secure, i.e. the normal application program, can here be made without any certification process of the functionally relatively more safe application program. This way the specifications of the legislator regarding the compliance with standards for the functional safety of machines can be fulfilled more easily and more cost-effectively for the operator of these machines, e.g., EN 13849, IEC 62061, or IEC 61508.

Such a device can be used as a freely programmable control, which as an independent product in a housing or as a component that can be connected to other components can be forwarded to a manufacturer or the operator of machines. The device may be freely programmable, without here a renewed certification being required after reprogramming, even with regards to AWPs which operate in connection with secure AWPs subject to certification.

Here, a computer unit suitable for functionally secure applications can be used, provided with a central computing unit (CPU), which comprises an on-chip flash drive and an on-chip RAM component. The CPU may be provided for a plurality of self-test mechanisms, so that it can be used e.g., for secure controls according to SIL2 or also SIL3. The computer unit usually also comprises an on-board flash drive and an on-board RAM component, which can be addressed via an external storage interface, e.g., a memory interface.

In other words, unlike systems and/or architectures of prior art, here not only a normal (LZS) is integrated on hardware, which is capable of starting and allowing the processing of an AWP, with the LZS reading data from physical inputs and bus systems and providing this data to the AWP for processing, and with by the LZS a cycle of the AWP being started and the input data and perhaps saved data being allocated to each other, and with at the end of the AWP cycle output data being provided, which is issued by the LZS to the physical outputs and bus systems, which would represent a fundamental functionality of an SPS. Not only a secure LZS is integrated on any arbitrary hardware, which operates in the same fashion as a normal LZS, and which additionally fulfills various safety standards, e.g., 61508 or 13849. This type of system design and/or system architecture is known from prior art. However, according to the invention rather a dual run-time system structure is provided, in which on a single hardware component at least two pairs respectively comprising AWP and LZS are provided, which are stable per se and can operate independently from the respective other pair. Here, the secure AWP can optionally be connected to the first storage component and to the secure LZS, e.g. in an exclusive fashion. The pairs are preferably connected to each other exclusively via the common storage (shared memory). Due to the fact that preferably only one CPU is provided for the entire system, respectively only one access can be processed. This way it is possible with simple means to avoid any collision between the AWPs, particularly by any access occurring at different times.

According to one exemplary embodiment, which can be combined with one of the above-mentioned exemplary embodiments, the storage means show a data exchange means and a storage section, with the second, normal application program being embodied for the purpose to run in the storage section utilizing the data exchange means as the operating memory.

Due to the fact that the normal APW runs in a storage section utilizing the data exchange means as the operating memory, here a separation can be yielded. The normal APW can optionally be connected to the data exchange means and to the normal LZS, perhaps exclusively. The allocation to specific hardware may be selected however in individual cases depending on the respective requirements. In particular, the allocation may occur according to the above-stated program storage units, operating memories, and common storage units.

According to one exemplary embodiment, which can be combined with one of the above-mentioned exemplary embodiments, the storage means comprises a data exchange means, which is embodied as a dual data exchange means with a first and a second part, with here the first part being embodied as a shared memory and the second run-time system being connected via the shared memory to the first application program or the first run-time system.

The data exchange means may be embodied as a dual storage component, which shows a common storage as a part thereof, here called shared memory. The first run-time system can be connected via the shared memory to the second application program. The connection may respectively be ensured via a separate communication path. The term "in connection with" may also be understood in the sense of "in communication with". The common storage (shared memory) may optionally also be provided between secure and normal AWP. The common storage (shared memory) may also be embodied as a part of an on-board RAM component. The common storage (shared memory) may be embodied as a homogenous operating memory and/or a part of a homogenous operating memory, with respectively different storage sections being available for the transportation and/or data exchange from the secure functionality to the normal functionality and vice versa.

According to one exemplary embodiment, which can be combined with one of the above-mentioned exemplary embodiments, the second run-time system and the second application program are connected to the second storage component. The second run-time system and the second application program are provided jointly in the second storage component, particularly isolated from the first run-time system and the first application program. Nonetheless, the functionality of the secure and the normal AWP can be ensured independent from any storage.

According to one exemplary embodiment, which can be combined with one of the above-mentioned exemplary embodiments, the storage means show a data exchange means and a storage section, with the first run-time system and the first application program may be connected via the data exchange means to the storage section. The second run-time system and the second application program are provided jointly in the storage section, particularly isolated from the first run-time system and the first application program. This way, an easily implemented storage design and/or storage arrangement can be yielded.

According to one exemplary embodiment, which can be combined with one of the above-mentioned exemplary embodiments, the device is embodied to perform a process control depending on six priority levels with increasing priorities, where in the first level with the lowest priority a background loop being provided and in a second level with higher priority the second application program being provided, and with the first application program being provided in a third and/or fourth level with respectively higher priorities being provided. This way, at two different safety levels any freedom from repercussion of the normal to the secure AWP can be yielded in a simple fashion.

According to one exemplary embodiment, which can be combined with one of the above-stated exemplary embodiments, a monitoring component is provided in a level with the second-highest priority and an interrupt is provided in a level with the highest priority. This way it can be ensured that a so-called watch dog (monitoring component) and a so-called interrupt (interrupting component) can engage in any case. The monitoring component may represent either a hardware component or a software component. A watch dog may represent a measure with an implementation of a secure LZS. This may be embodied e.g., as a software task with high priority, however it may also represent a hardware component. Here, particularly only the real-time interrupts show a higher priority than the monitoring component, e.g., regarding interfaces or timers.

The monitoring component and/or the protective component may be provided for the purpose of ensuring the freedom from repercussions of the normal application program, particularly by the monitoring component being provided as a MMU (memory management unit) and/or the protective component as a MPU (memory protection unit), thus using standard hardware installations, e.g., of a 32-bit CPU, which are capable of blocking access to freely selected storage sections. Here, e.g., upon leaving the secure part of the software-process, the secure part of the storage used can be blocked such that any, even unintentional, access is impossible from the normal software process. This way, the freedom from repercussion of the normal software process upon the secure software process is ensured. The freedom from repercussion can here be ensured separated from the system monitoring. According to the invention the AWP functionality is here separated by the run-time system structure, i.e. at least two AWPs are provided with different safety levels. A division of an AWP functionality into a secure and a normal part is provided. Although they are separated from each other, the AWPs may represent a functional unit, particularly because they can process on the very same hardware component.

The hardware component may show digital and/or analog inputs and outputs of a different embodiment, and the hardware component may show at least one bus system. One embodiment may be defined e.g., by features, such as digital, analog, counting, switching, power input, power output, and the like. For example a CAN, USB, or Ethernet system or variations thereof, or any arbitrary other bus system may be provided as the bus system.

According to one exemplary embodiment the hardware component may be embodied as a single-channel one in the eyes of the user, so that only one processor core needs to provide computing results, which are then further processed and the redundant processor core only performs monitoring tasks. Here, a lock-step mode may be provided, thus an operating type in which two CPU-cores coexist side-by-side and process the same tasks, and at the end of each task a comparison occurs of the results, in order to analyze, based on this comparison, if any safety problem is or is not given.

Here it is not necessary for complete redundancy to be given, particularly regarding the program part and the data storage part, but it is sufficient that a second CPU-core is provided, which checks the execution of processor commands of the first CPU core.

In order to solve at least one of the above-mentioned objectives, as already mentioned, a method according to the preamble of claim 11 can be assumed, in which according to the invention the run-time system is integrated in a run-time system structure, which is embodied at least in duplicate, and which is based on a first and a second run-time system, with the first run-time system being embodied as a secure run-time system and the second one as a normal run-time system, comprising the steps:

processing tasks of a normal application program, executed via the normal run-time system, in a first priority level;

processing tasks of a safe application program, executed via the secure run-time system, in a second priority level, which shows higher priority than the first priority level, with the secure run-time system activating the normal run-time system; and monitoring the process of the secure run-time system by a monitoring component provided in a third priority level with higher priority than the second priority level, with the secure run-time system being embodied for the purpose of running one or more secure operating conditions, particularly shutting off safety-relevant outputs.

Here, in case of an error an indication occurs in the AWP and a reaction from the AWP. The monitoring component is here provided to monitor the secure LZS. It is not necessary for the normal LZS to be directly in connection with the monitoring component. In the variant to secure safety monitoring by shutting off safety-relevant outputs the status secure can preferably be equivalent to the status current-less.

This way it can be ensured that the normal LZS can also be forced to interrupt the processing of normal tasks in case of a safety problem.

According to one exemplary embodiment, physical input and/or output information can be detected via sensors (e.g., by an oil-pressure sensor) and/or actuators (e.g., for a hydraulic valve) in the secure context and read and/or written as well as read and/or written via interfaces (e.g., CAN, RS232, etc.) in a secure context. Secure inputs/ outputs as well as interfaces with secure communication can here be allocated to the secure AWP, and inputs/outputs and interfaces not requiring any particular safety standards may be allocated to the normal AWP. The respective allocation may occur via configuration or functions in AWP. The secure AWP can transmit via a common storage, particularly the above-mentioned first part of
the data exchange means, the input and interface data allocated to the normal AWP, and here also recall and/or obtain the respective output and interface data.

Any recall free from repercussion can be ensured in that the above-described device ensures the process according to a functionally secure processing plan (so-called scheduler mechanism). Here, system monitoring can ensure the compliance with this scheduler mechanism according to one potential embodiment. The system monitoring is provided according to a potential embodiment on one of the upper priority levels. Here, e.g., six different priority levels can be provided, in which program parts can be processed and/or executed similar to tasks. In connection with a normal background loop, showing a low first priority level with regards to security, the normal AWP is preferably executed on this priority level or a second priority level. For the secure AWP, with regards to safety, priority levels based thereupon may be provided, particularly two, a normal one and a privileged level based thereupon (priority 3 and 4). In the third level a secure background AWP may be provided, and in the fourth level a secure privileged AWP may be provided.

A monitoring component arranged in another level with even higher priority (priority 5) (so-called watch dog) can monitor the maximal processing times of the individual priority levels and ensure that the secure AWP is processed in accordance with the requirements and cyclically. In another, highest priority level (priority 6) interrupting components (so-called hardware interrupts) can be arranged. Here, three priority blocks may be discussed, namely a first block with the background loop and the normal AWP, a second
block with the secure AWP, and a third block with the controlling components watch dog and interrupts, i.e. the system monitoring is provided in the third block.

The invention also relates to a computer system for a safety-critical application in a machine environment, which is embodied for process control of application programs based on a run-time system structure, with the computer system comprising:

a receiver device for the input of commands;

a processing environment, which is integrated on a single hardware component; and an output device which is formed for data output.

The computer system may show at least one storage medium, into which a computer program can be uploaded for a device.

It shall be noted that the above-mentioned exemplary embodiments can generally be combined with each other, unless explicitly the opposite being stated.

BRIEF DESCRIPTION OF THE FIGURES

The invention is explained in greater detail in the figures of the following drawing. It shows FIG. 1 a storage and functions list according to one exemplary embodiment of the invention.

DETAILED DESCRIPTION OF THE PREFERRED EMBODIMENT

Figure 1:
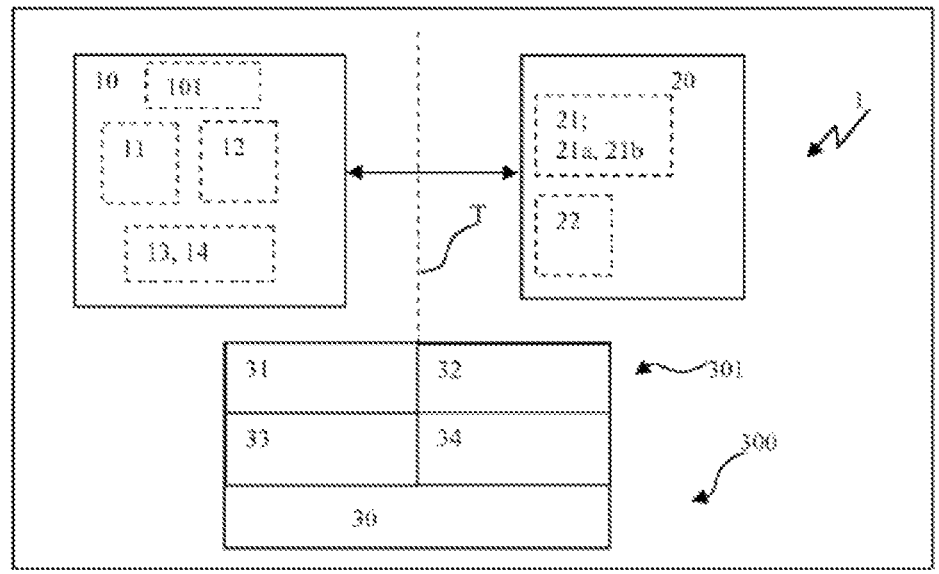

FIG. 1 shows a device 1 for a safety-critical application, comprising a central computer 10, which shows a monitoring component 11 and/or a protective component 14, and which is in communication with a microcontroller 101 as well as a first storage component 12 and a second storage component 13 and/or which comprises these components. The central computer 10 is in communication with storage media 20, which include a data exchange means 21 and a storage section 22. Further, a hardware component 30 is shown, which is in connection to a secure run-time system (LZS) 33 and a safe application program (A WP) 31, as well as a normal run-time system (LZS) 34 and a normal application program (AWP) 32 and/or which comprises these components. The design shown is a part of the hardware architecture 300 and/or the run-time system structure 301. FIG. 1 indicates a separating level T, which extends between the normal LZS 34 and/or A WP 32 and the secure LZS 33 and/or A WP 31. The hardware component 30 itself is provided at both sides of the separating line T, i.e. the separating line T extends through the hardware component 30. The separating line is rather a logical separating line than a physical one. This means, the type of realization in the hardware is rather irrelevant for ensuring the safety of the functionality. The separating line may particularly be realized by different storage components. However, it may also be formed only in a logical sense, particularly when all storage sections are combined in one storage unit. If the separating level is of a logical type, the separation and/or freedom from repercussion can particularly be realized via the monitoring component and/or the protective component, particularly MMU and/or MPU, which can be isolated from other storage sections, regardless if the storage sections are provided in one or in various physical storage units. In other words, MMU and/or MPU may ensure a separating level by isolating storage sections, figuratively speaking, while the system monitoring separates individual processes from each other and monitors their correct execution. This way, MMU and/or MPU can be analyzed independent from any priority levels because they are not forced to interfere in the processes.

Any isolation of storage sections can particularly occur such that the MMU and/or MPU are arranged upstream in reference to an address generating logic. When a context change occurs, thus a transition from a secure AWP to a normal AWP or vice versa, the protection and/or the security in the secure AWP can be ensured by allocating suitable starting and/or end addresses.

It shall be mentioned that the parts of the first storage component 12 and the second storage component 13 can also be provided in the storage means 20. In general, measures for the functional safety do not necessarily need to be supported by the components storage means 20 and data exchange means 21.

It shall also be mentioned that generally differentiation can occur into five or more, particularly nine, different storage sections: on the one hand a program storage section, which is divided into a secure and a normal program storage section, which respectively are further divided into a section with reference to AWP and a section with reference to LZS, on the other hand an operating storage section, divided into a section with reference to AWP and a section with reference to LZS, and finally also with a so-called shared memory.

Figure 2A:
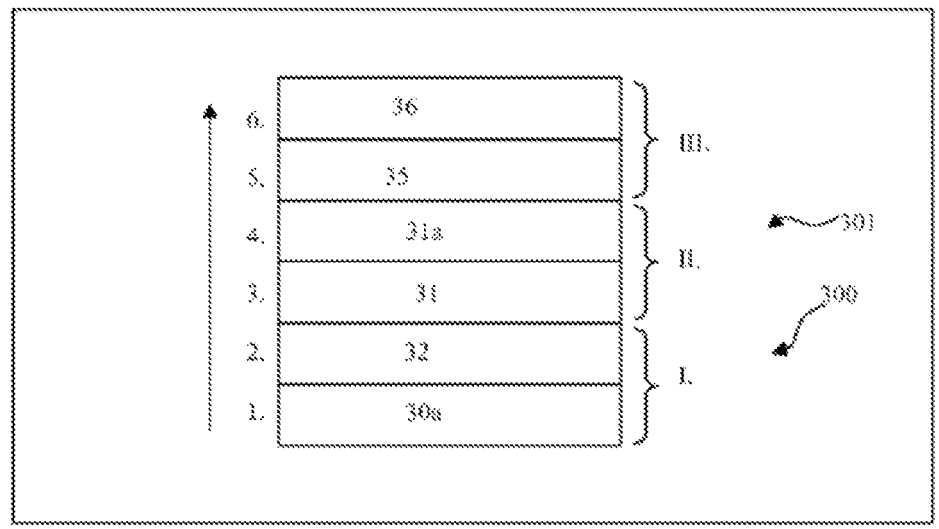
FIG. 2a the different (safety) ranks in a device and a method according to one exemplary embodiment of the invention.

FIG. 2a shows how individual components of the device according to the invention can be arranged in different priority levels 1 to 6, in order to ensure a process free from repercussions. In connection with a normal background loop 30a, in a priority level 1 low with regards to security, the normal AWP 32 runs on this priority level or a second priority level 2. The background loop 30a is here without any time requirements. Priority levels 3 and 4 can be provided based thereupon for the secure AWP 31, 31a with regards to security, particularly two, a normal one (3) and a privileged level (Priority 3 and 4) based thereupon. In the third level 3 a secure background AWP 31 may be provided, and a secure privileged AWP 31a may be provided in the fourth level.

A monitoring component 35 (so-called watch dog), arranged in another level with even higher priority (priority 5) can monitor the max. processing periods of the individual priority levels and ensure that the secure AWP 31, 31a is processed in accordance with the specifications and in a cyclical fashion. Here, the levels 2 to 5 may be considered four task timers, which are provided by the microcontroller and/or the structure of the microcontroller. In other words, the timers may be used in connection with the microcontroller as a replacement operating system, and different task levels may be provided without an operating system, particularly depending on the structure of the respective microcontrollers. In another, highest priority level (priority 6), interrupter components 36 (so-called hardware interrupts, particularly time interrupts) may be arranged. In this sixth level, e.g., incoming messages may be processed.

Thus, three priority levels I, II, and III can be discussed, namely a first block I with the background loop 30a and the normal AWP 32, a second block with the secure AWP 31, 31a, and a third block III with the controlling components watch dog 35 and interrupts 36, i.e. in the third block a system monitoring is provided and/or the third block is formed by system monitoring. The design shown is a part of the hardware architecture 300 and/or the run-time system structure 301, in which different safety levels may be arranged side-by-side.

The example of an architecture 300 and/or a run-time system structure 301 shown in the example of FIG. 2a is one of several potential examples. It shall be mentioned that the design of the levels shown and/or their number may be varied, particularly depending on the technical features of the respectively used microcontroller. Here, two to five priority levels seem beneficial for normal applications, however, considerably more priority levels with respectively staggered safety levels may be provided. FIG. 2a shows three and/or four safety-staggered levels: level 3, 4 and 5 and/or 1, 3, 4, and 5, depending on the background loop 30a are classified safety-relevant. Optionally, according to one variant the secure AWP may already be provided in the level of the background loop. It shall be mentioned that the allocation to individual priority levels can here be freely selected, in general. Optionally, in a variation of this exemplary embodiment, e.g., it is possible to process the tasks on only two safety-staggered levels, e.g., the levels 3 and 4, and not on level 2.

Figure 2B:
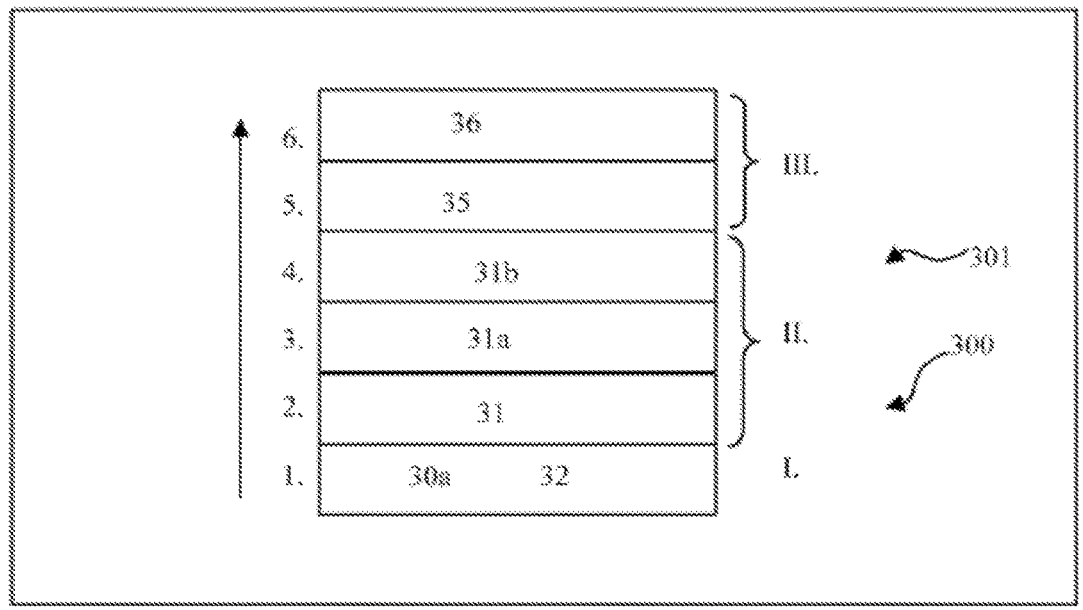
FIG. 2b the different ranks in a device and a method according to another exemplary embodiment of the invention.

FIG. 2b shows a variant of the architecture illustrated in FIG. 2a, in which in the first priority level, in addition to the background loop 30a, the normal AWP 32 is also provided, and the secure AWP 31 is provided in the second priority level, and one and/or the privileged secure AWP 31a is provided in the third priority level, with the third priority level perhaps also being considered for the privileged secure AWP as a process level for faster tasks of the secure LZS 33. The fourth priority level is also embodied as another processing level for faster tasks of the secure LZS 33, so that in this variant three levels of different priority are provided for the secure LZS. This way, the second block II is provided for tasks in the context with the secure AWP 31 and/or processing levels 31*a*, 31*b* for faster tasks of the secure LZS 33 over three priority levels.

Figure 2C:
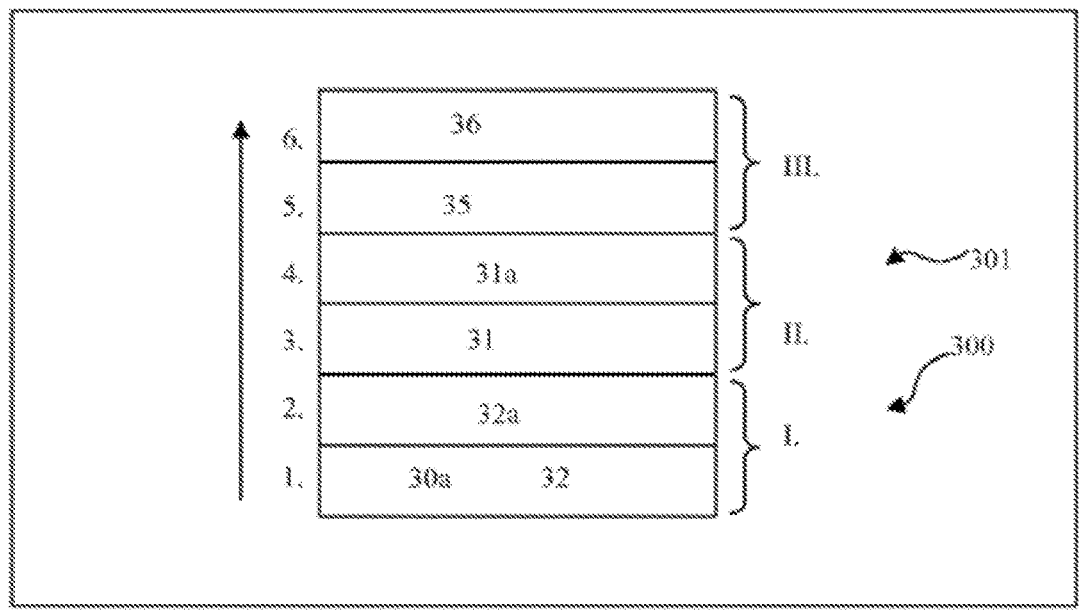
FIG. 2c the different ranks in a device and a method according to yet another exemplary embodiment of the invention.

FIG. 2*c* shows another variant of the architecture shown in FIG. 2*a*, in which in a first priority level, in addition to the background loop 30*a*, the normal AWP 32 is provided as well, and a privileged normal AWP 32*a* is provided in the second priority level, and the secure AWP 31 is provided in the third priority level, and one and/or the privileged secure AWP 31*a* is provided in the fourth priority level, with the second priority level for the privileged normal AWP 32*a* potentially also being considered a processing level for faster tasks of the normal LZS 34. The fourth priority level is embodied as another processing level for faster tasks of the secure LZS 33. This way, the second block II, for tasks in the context with the secure AWP 31 and/or the processing levels 31*a*, is also provided for faster tasks of the secure LZS 33 as in the case of FIG. 2*a* over two processing levels.

Figure 3:
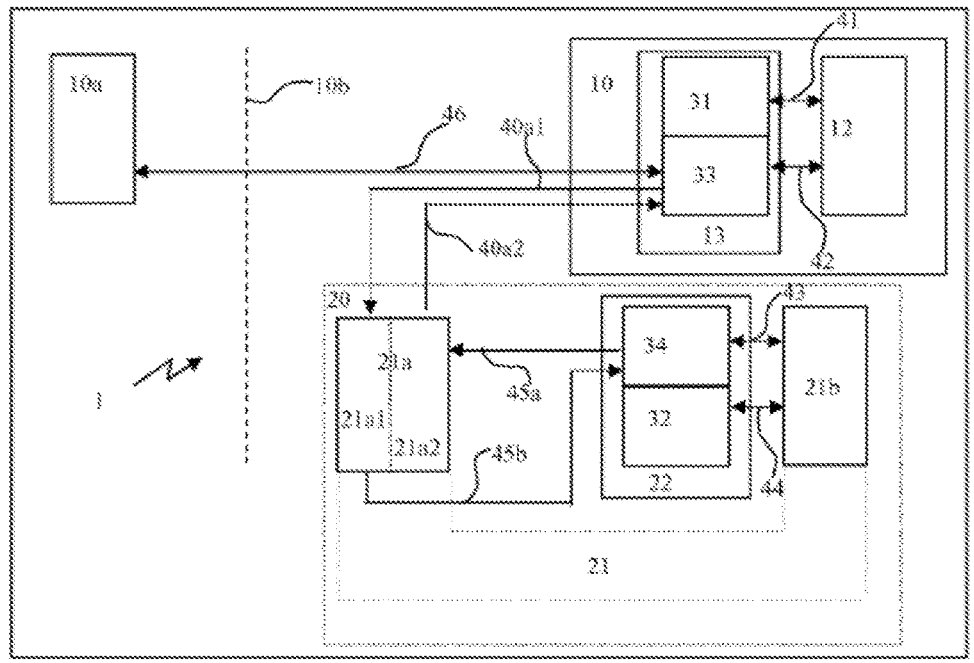
FIG. 3 a model for a communication according to a first exemplary embodiment of the invention, with the flux of input and output information being shown for a secure and a normal AWP.
Figure 4:
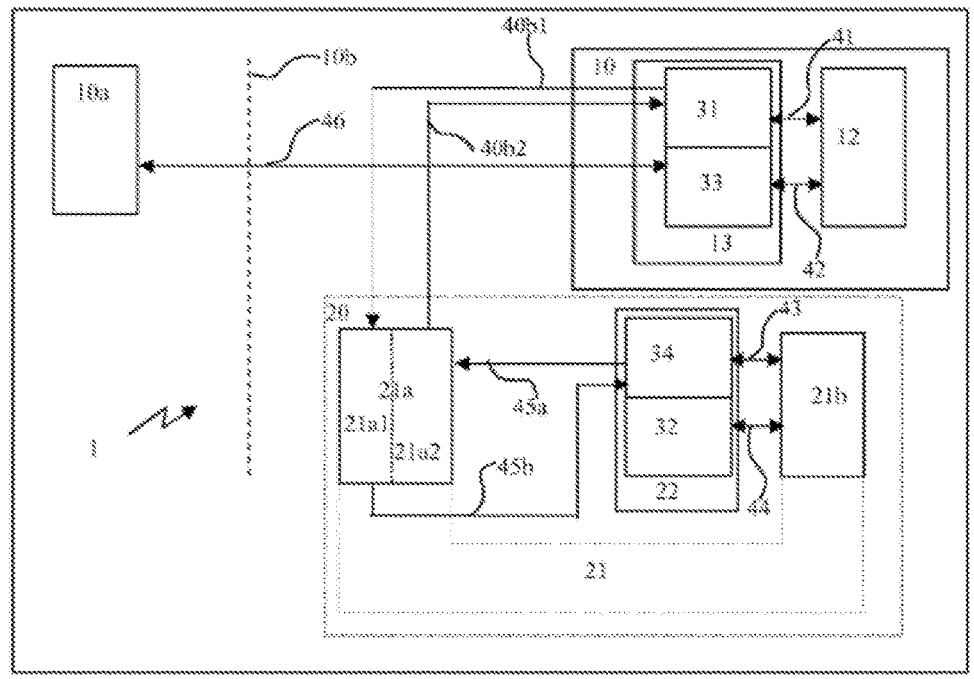
FIG. 4 a model for a communication according to a second exemplary embodiment of the invention, with the flux of input and output information being shown for a secure and a normal AWP.

FIGS. 3 and 4 show two models as examples of how the exchange of input and/or output information can occur between a secure AWP and a normal AWP, with the data exchange either occurring via the secure LZS 33 of the secure AWP 31 or via the secure AWP 31 itself. This way, respectively one communication component 10*a* is indicated which is connected via an interface 10*b* to a central computer (CPU) 10.

FIG. 3 shows a first on-board RAM-component 21*a*, which can perform a function as a common storage (shared memory). Further, a second on-board RAM component 21*b* is shown, which can perform a function to illustrate normal input and/or output information. Further, an on-chip RAM component 12 is shown, which can perform a function to illustrate secure input and output information.

FIG. 3 shows that physical input and/or output information via sensors (e.g., from an oil-pressure sensor) and/or actuators (e.g., for a hydraulic valve) as well as via interfaces (e.g., CAN, RS232, etc.) can be exclusively read and/or written in the secure context. Secure input/output paths as well as interfaces with secure communication are here allocated to the secure AWP 31, other input/output paths as well as other interfaces are allocated to the normal AWP 32. The respective allocation occurs either via configuration and/or via functions in the AWP itself.

The secure AWP 31 transmits via common storage (shared memory section) 21*a*, to be allocated to the on-board RAM-component 21, the input and interface data allocated to the normal AWP 32 and also obtains here the respective output and interface data.

Similar to FIG. 3, FIG. 4 shows a first on-board RAM component 21*a*, which can accept a function as common storage (shared memory). Further, a second on-board RAM component 21*b* is shown, which can accept a function for illustrating normal input and/or output information. Further, an on-chip RAM component 12 is shown, which can accept a function to illustrate secure input and/or output information.

FIGS. 3 and 4 further indicate communications paths 40*a*1, 40*a*2 between the first part 21*a* of the data exchange means and the secure LZS 33 as well as the communication paths 40*b*1, 40*b*2 between the first part 21*a* of the data exchange means 21 and the secure AWP 31. Here, a connection is given from the secure LZS 33 to the normal LZS 34 via a first section 21*a*1 of the first part of the data exchange means, and a connection from the normal LZS 34 to the secure LZS 33 via a second section 21*a*2 of the first part of the data exchange means.

The communication paths 40*a*1, 40*a*2, 40*b*1, 40*b*2 may be accessed, e.g., via parallel interface, PCI, SPI, or other common processor interfaces. Here, the microcontroller can directly access the data exchange means 21. The access may be initiated from various software levels, but in both cases as well as during data exchange via the communication paths 40*a*1, 40*a*2, as well as during data exchange via the communication paths 40*b*1, 40*b*2, the access may also be executed and/or initiated by secure LZS. A fifth connection 45*a* is also indicated in the direction of the data exchange means 21 and/or the fifth connection 45*b* in the direction towards the normal LZS. It shall be mentioned that the first storage component 12 and the data exchange means 21 do not necessarily need to use different storage units. Optionally, they may be present as parts of a single physical storage unit.

Further, a first to sixth connection 41, 42, 43, 44, 45*a*, 45*b*, and 46 are indicated, which can be generated e.g. via parallel interface, PCI, SPI, or other common interfaces. In particular the connection 46 can represent e.g., a parallel port, an A/D converter, or a CAN-BUS interface.

Figure 5:
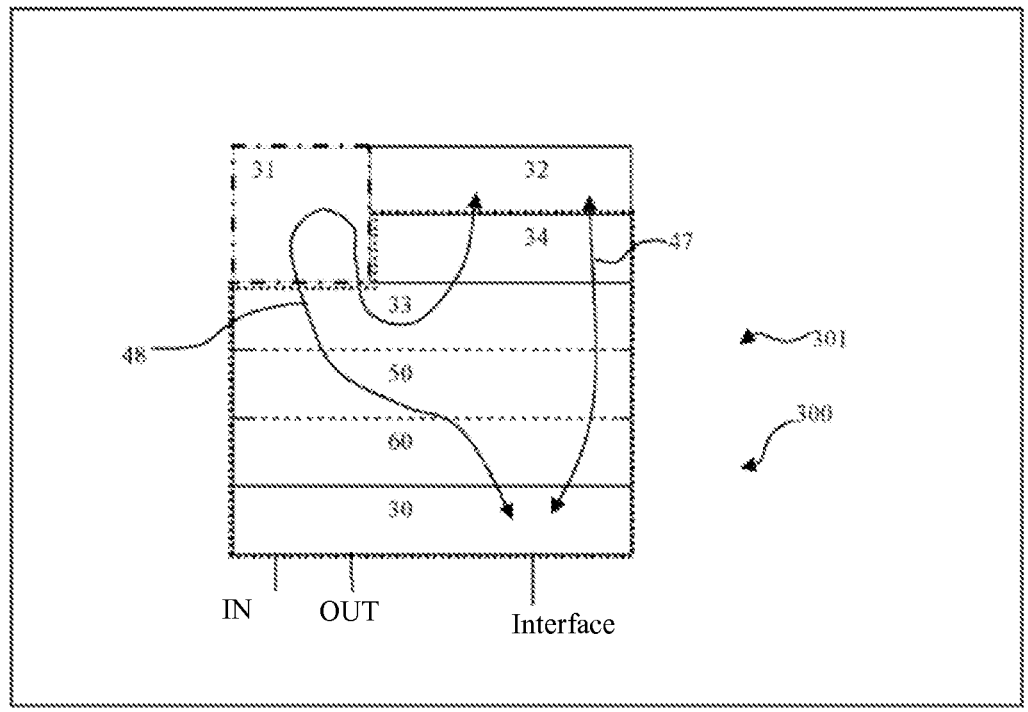
FIG. 5 a schematic structure of a hardware architecture and/or a run-time system structure according to an exemplary embodiment of the invention, with two paths shown as examples, by which an exchange of data can occur between the hardware level and the normal and/or the secure AWP.

It is schematically illustrated in FIG. 5 how the LZS and the A WP can be connected to each other. A hardware component 30 is provided as the basis, which is e.g., embodied with an input (in), an output (out), and an interface. A so-called low level driver 60 is provided between a secure LZS 33 and the hardware component 30. The secure LZS 33 interacts with this driver 60, thus a dot-dash line is indicated between the secure LZS 33 and the driver 60. Optionally, as illustrated, a safe operating system 50 may be provided between the secure LZS 33 and the driver 60, which also can interact with the secure LZS 33 and/or the driver 60 (dot-dash line). A normal LZS 34 follows the secure LZS 33. Strictly speaking, only the secure LZS 33 interacts with the hardware component 30.

The above-stated components can be certified together, thus they are shown as a certified package outlined with a dot-dash line, with the manufacturer and/or provider of controls being responsible for certification. The normal LZS 34 follows a normal AWP 32, with it not being necessary for the customer to certify it. The secure LZS 33 is followed by a secure AWP 31, with here the customer being responsible for certification.

The normal LZS 34 as well as the secure LZS 33 may be provided e.g., as separate components from a system supplier, when it may relate to conventional, commercially available normal and/or secure LZSs. However the provider of the control is responsible for the hardware component 30, connected to the driver 60, and perhaps also connected to an operating system 50. The provider of the control is responsible for the appropriate connection of the normal LZS 34 to the secure LZS 33, and this is considered a particular focus because, by the connection of the normal LZS 34 to the secure LZS 33, the customer can be provided with the advantage that only the secure AWP 31 needs to be certified (one time). The normal AWP 32 can be changed by the customer within a wide range. Here, the secure LZS 33 is in control of all processes, figuratively speaking, and can particularly control the cooperation of the components during data exchange by allocating the other components to differently high priority levels. The secure LZS 33 can also provide the interface towards the outside.

Further, FIG. 5 shows two paths for a data exchange in a sketch as an example, namely a first path 47 and a second path 48. In the first case, starting at the hardware component 30, via the path 47, routing and/or forwarding occurs from the secure LZS 33 directly to the normal AWP 32 and vice versa. Here, a common storage (shared memory) LZS can be used. In the second case, information required by the normal AWP 32 is routed and/or forwarded via the path 48 based on the hardware component 30 from the secure LZS 33 via the normal LZS 34 to the normal AWP 32 and vice versa, including and particular via the secure AWP 31. Here, a common storage (shared memory) AWP may also be used.

Figure 6:
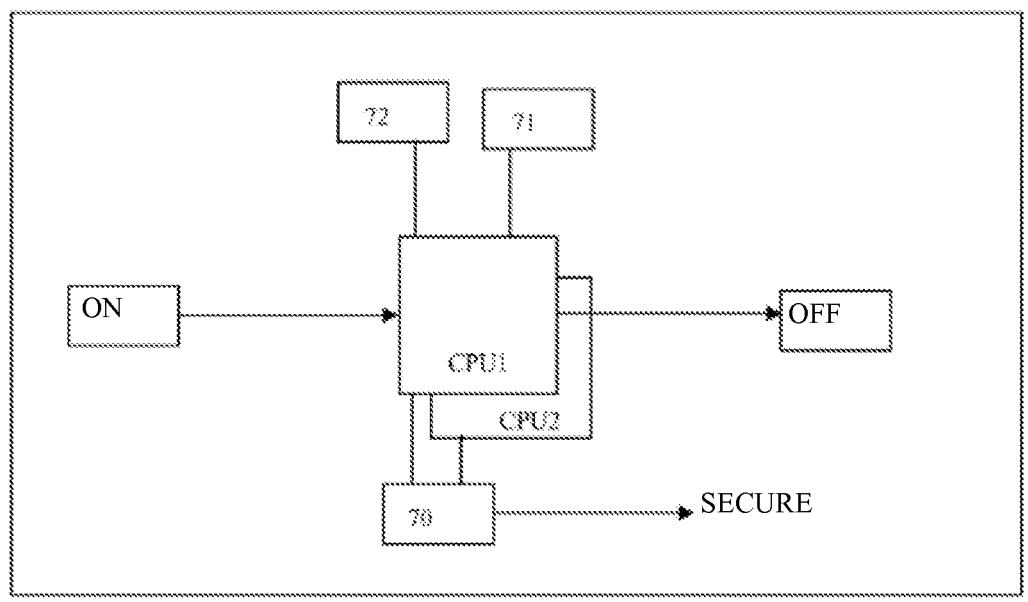
FIG. 6 a schematic sketch of an arrangement of two CPU-cores in reference to other components so that a dual-channel system can be simulated in a lock-step mode.

FIG. 6 explains in a sketch how by a lock-step mode a two-channel mode can be simulated, without it being necessary to implement all components in a redundant fashion. In addition to a first CPU-core (CPU1) a second CPU-core (CPU2) is provided, input data (IN) is processed by both CPU-cores, and their result shall be checked by a comparator 70, with output data (OUT) being generated only once and only one data storage part 71 and one program part 72 being used. If the comparator 70 detects any deviation, switching occurs into a secure and/or one of several differently secure, staggered operating stages (SECURE), according to a fail-safe status.

Figure 7:
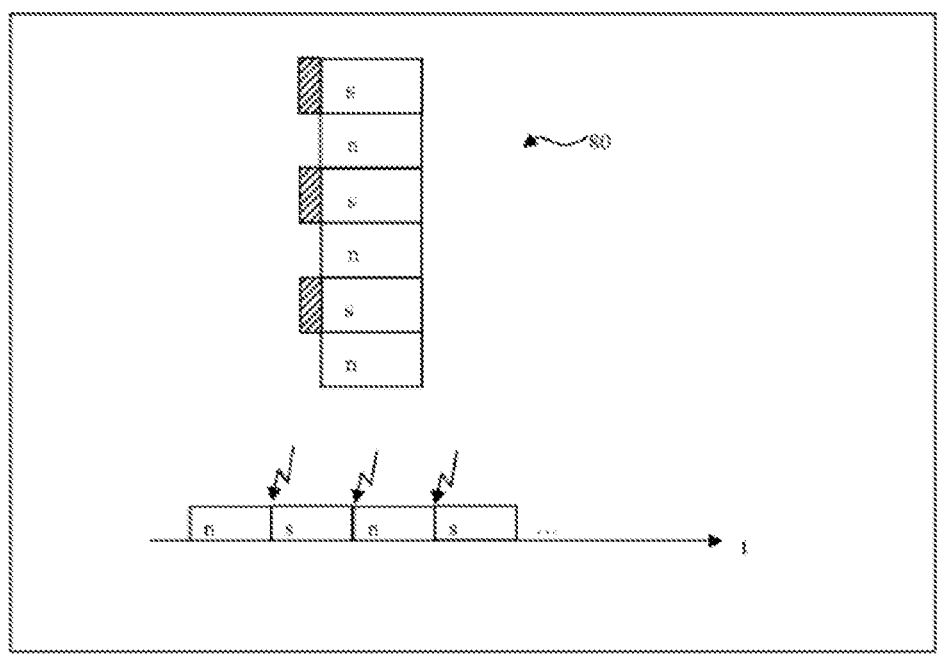
FIG. 7 a schematic sketch of a storage section isolated by a monitoring component and/or a protective component.

FIG. 7 shows a schematic sketch of a storage section 80, isolated via a monitoring component and/or a protective component, particularly MMU and/or MPU, which shows secure sections (s) and normal sections (n), with the change being shown from a secure to a normal section on a time axis t, namely at the arrows at the transition from the secure storage section (s) into the normal storage section (n) and vice versa, with the arrows indicating the change of context. In one context change, a blockage of the secure section (s) can occur by MMU and/or MPU, which is illustrated by the dot-dash rectangles. This way, access to secure section (s) can be excluded. Additionally, the blocking can occur when the entire control is brought into a secure or a particularly secure operating state.

LIST OF REFERENCE CHARACTERS

1 Device for a safety-critical application
10 Central computer (CPU)
101 Microcontroller
10a Communication component
10b Interface
11 Monitoring component, particularly memory management unit (MMU)
12 First storage component, particularly integrated work storage component (on-chip RAM component)
13 Second storage component, particularly integrated flash drive (on-chip flash component)
14 Protective component, particularly memory protection unit (MPU)
20 Storage means
21 Data exchange means, particularly two-part data exchange means, particularly two-part on-board RAM component
21a First part of the data exchange means, particularly on-board RAM component, which may be embodied as a common storage, thus a so-called shared memory;
21a1 First section of the first part of the data exchange means
21a2 Second section of the first part of the data exchange means
21b Second part of the data exchange means, particularly on-board RAM component
22 Storage section, particularly on-board flash drive
30 Hardware component
30a Background loop
300 Hardware architecture
301 Run-time system structure
31 First, secure application program (AWP)
31a Privileged secure AWP and/or process level for faster tasks of the secure LZS
31b Additional processing levels for faster tasks of the secure LZS
32 Second normal AWP
32a Privileged normal AWP and/or processing level for faster tasks of the normal LZS
33 First secure run-time system (LZS)
34 Second normal LZS
35 Monitoring component (so-called watch dog)
36 Interruption component (so-called interrupt)
40a1 First communication path between the first part 21a of the data exchange means and the secure LZS 33
40a2 Second communication path between the first part 21a of the data exchange means and the secure LZS 33
40b1 First communication path between the first part 21a of the data exchange means and the secure APW 31
40b2 Second communication path between the first part 21a of the data exchange means and the secure AWP 31
41 First connection and/or communication path
42 Second connection and/or communication path
43 Third connection and/or communication path
44 Fourth connection and/or communication path
45a Fifth connection/communication path in the direction towards the data exchange means
45b Fifth connection/communication path in the direction towards the normal LZS
46 Sixth connection and/or communication path
47 First exemplary path for a data exchange
48 Second exemplary path for a data exchange
50 Operating system
60 Low level driver
70 Comparator
71 Data storage part
72 Program part
80 Isolated storage section
I First priority block, particularly priority level 1 and 2 in FIGS. 2a and 2c, and/or priority level 1 in FIG. 2b
II Second priority block, particularly with priority levels 3 and 4 in FIGS. 2a and 2c, and/or priority levels 2, 3, and 4 in FIG. 2b
III Third priority block, particularly with priority level 5 and 6
1-6 First to sixth priority level
T Separating level

The invention claimed is:

1. A device for an application, critical for safety of a process and execution, in a freely programmable electronic control in a machine environment, which comprises a computer and is embodied for the process control of application programs based on a run-time system comprising:
a hardware component, in which the run-time system is integrated;
a central computer, which comprises a microcontroller with a monitoring component and/or a protective component and a first storage area and a second storage area; and
storage media connected to the central computer;

wherein the run-time system is a component of a run-time system structure in the form of a computer program, which is embodied at least in duplicate and which is based on a first run-time system and a second run-time system, the first run-time system being embodied as a safe system and the second run-time system embodied as a normal run-time system, with the run-time system structure representing a structure or environment for a run-time system which is configured to integrate an individual run-time system into the machine environment such that a normal application program and a safe application program can run on the computer of the machine environment;

an operating system or a replacement for an operating system is provided to generate different priority levels, in which a timer of the central computer is used for generating the different priority levels; and the safe application program and the normal application program processing in parallel and independent from each other and any influence of the normal application program upon the safe application program being excluded, by the safe run-time system being given priority in reference to the normal run-time system;

the safe application program being capable of preventing the normal application program from processing tasks, wherein both the safe application program and the normal application program interact with the hardware component;

wherein the storage media comprise data exchange means, which are embodied as dual data exchange means with a first part and a second part, with the first part being embodied as a common storage and the second run-time system being in connection via the common storage to the first application program or the first run-time system;

wherein the second run-time system and the second application program are connected to the second storage area.

2. A device according to claim 1, wherein the first run-time system is provided for processing a first application program and the second run-time system is provided for processing a second application process, with both application programs being integrated in the hardware component.

3. A device according to claim 1, wherein the first safe application program is embodied to run in the second storage area with the use of the first storage area as the operating storage.

4. A device according to claim 1, wherein the storage means media comprise data exchange means and a storage section, and the second, normal application program is embodied to run in the storage section utilizing the data exchange means as the operating storage.

5. A device according to claim 1, wherein the first storage area represents a first storage component and the second storage area represents a second storage component.

6. A device for an application, critical for safety of a process and execution, in a freely programmable electronic control in a machine environment, which comprises a computer and is embodied for the process control of application programs based on a run-time system comprising:

a hardware component, in which the run-time system is integrated;

a central computer, which comprises a microcontroller with a monitoring component and/or a protective component and a first storage area and a second storage area; and storage media connected to the central computer;

wherein the run-time system is a component of a run-time system structure in the form of a computer program, which is embodied at least in duplicate and which is based on a first run-time system and a second run-time system, the first run-time system being embodied as a safe system and the second run-time system embodied as a normal run-time system, with the run-time system structure representing a structure or environment for a run-time system which is configured to integrate an individual run-time system into the machine environment such that a normal application program and a safe application program can run on the computer of the machine environment;

an operating system or a replacement for an operating system is provided to generate different priority levels, in which a timer of the central computer is used for generating the different priority levels; and the safe application program and the normal application program processing in parallel and independent from each other and any influence of the normal application program upon the safe application program being excluded, by the safe run-time system being given priority in reference to the normal run-time system;

the safe application program being capable of preventing the normal application program from processing tasks, wherein both the safe application program and the normal application program interact with the hardware component;

wherein the storage media comprise data exchange means, which are embodied as dual data exchange means with a first part and a second part, with the first part being embodied as a common storage and the second run-time system being in connection via the common storage to the first application program or the first run-time system;

wherein the storage media comprise the data exchange means and a storage section, and the first run-time system and the first application program are connected via the data exchange means to the storage section.

7. A device for an application, critical for safety of a process and execution, in a freely programmable electronic control in a machine environment, which comprises a computer and is embodied for the process control of application programs based on a run-time system comprising:

a hardware component, in which the run-time system is integrated;

a central computer, which comprises a microcontroller with a monitoring component and/or a protective component and a first storage area and a second storage area; and storage media connected to the central computer;

wherein the run-time system is a component of a run-time system structure in the form of a computer program, which is embodied at least in duplicate and which is based on a first run-time system and a second run-time system, the first run-time system being embodied as a safe system and the second run-time system embodied as a normal run-time system, with the run-time system structure representing a structure or environment for a run-time system which is configured to integrate an individual run-time system into the machine environment such that a normal application program and a safe application program can run on the computer of the machine environment;

an operating system or a replacement for an operating system is provided to generate different priority levels, in which a timer of the central computer is used for generating the different priority levels; and the safe application program and the normal application program processing in parallel and independent from each other and any influence of the normal application program upon the safe application program being excluded, by the safe run-time system being given priority in reference to the normal run-time system;

the safe application program being capable of preventing the normal application program from processing tasks, wherein both the safe application program and the normal application program interact with the hardware component;

wherein the device is embodied such that a process control is performed depending on six priority levels with increasing priority, with a background loop being provided in a first level with the lowest priority and the second application program being provided in a second level with higher priority, and with the first application program being provided in a third and/or fourth level with respectively higher priority.

8. A device according to claim 7, wherein a monitoring component is provided in a level with second-highest priority and an interrupter component is provided in a level with highest priority.

9. A system including a device according to claim 1 for process control of safety-critical application programs.

10. The use of a device according to claim 1 in a mobile work machine or in the outdoor section exposed to the elements outside a protected machine shop.

11. A computer program stored in a memory for performing a method executed by a device according to claim 1.

12. A computer program, which is embodied in a memory to perform a method executed by a system according to claim 9, when the computer program is uploaded into a computer.

13. A non-transitory computer-readable storage medium with a computer program saved on the storage medium, which is embodied to execute a method performed by a system according to claim 9, when the computer program has been uploaded to the computer.

14. A computer system for a safety-critical application in a machine environment, which is embodied to control the process of application programs regulating and executing actuation of a machine based on a run-time system structure, the computer system comprising:
- a reception device;
- a device according to claim 1;
- a processing environment, which is integrated on a single hardware component and which shows the device; and
- an output device.

* * * * *

UNITED STATES PATENT AND TRADEMARK OFFICE
CERTIFICATE OF CORRECTION

PATENT NO. : 10,394,212 B2
APPLICATION NO. : 14/410528
DATED : August 27, 2019
INVENTOR(S) : Holler et al.

It is certified that error appears in the above-identified patent and that said Letters Patent is hereby corrected as shown below:

On the Title Page

(30) Foreign Application Priority Data: "Jun. 26, 2012 (DE) 10 2012 012 521" should read -- Jun. 26, 2012 (DE) 10 2012 012 521.6 --

Signed and Sealed this
Twelfth Day of November, 2019

Andrei Iancu
*Director of the United States Patent and Trademark Office*